Patented Apr. 7, 1942

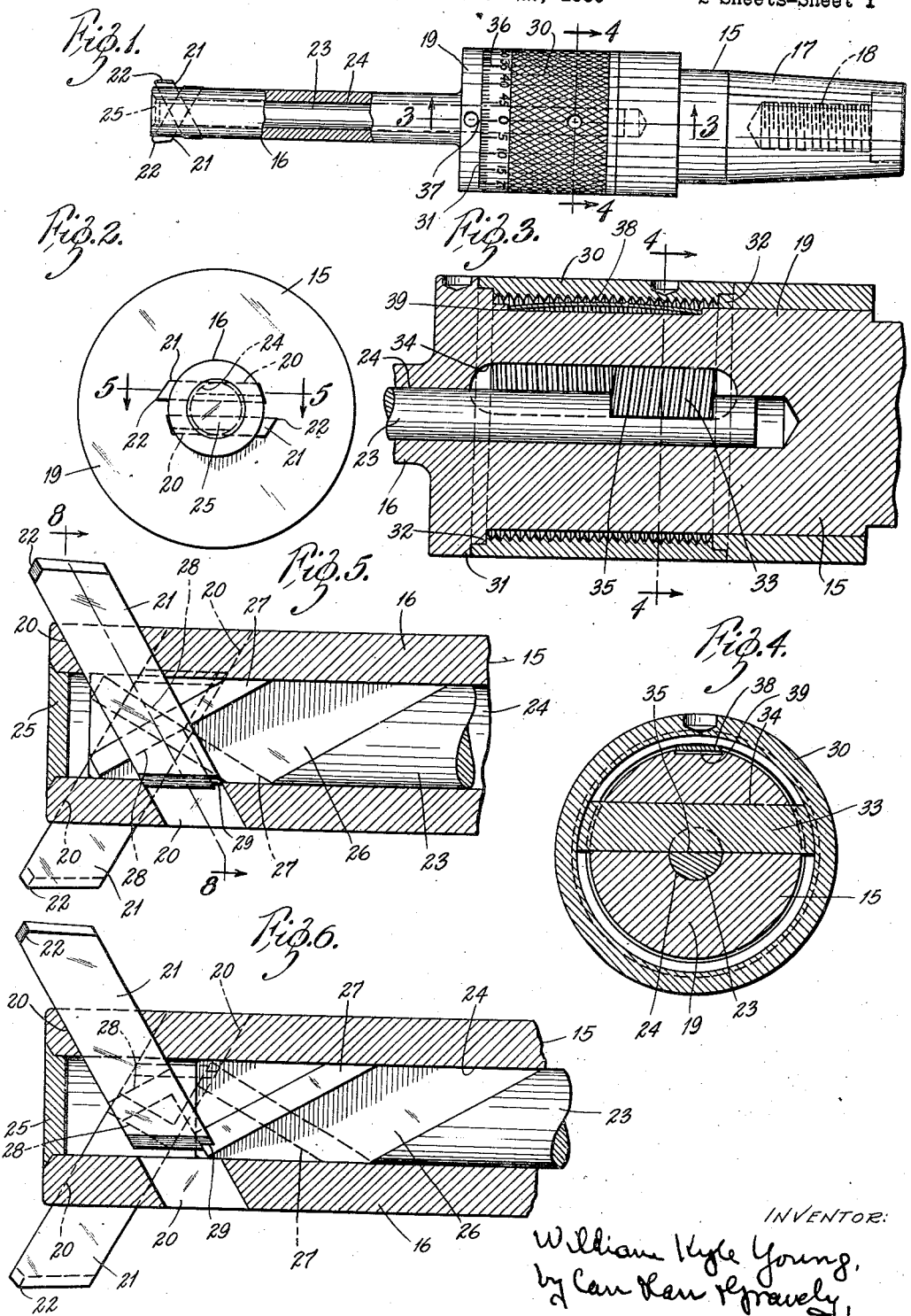

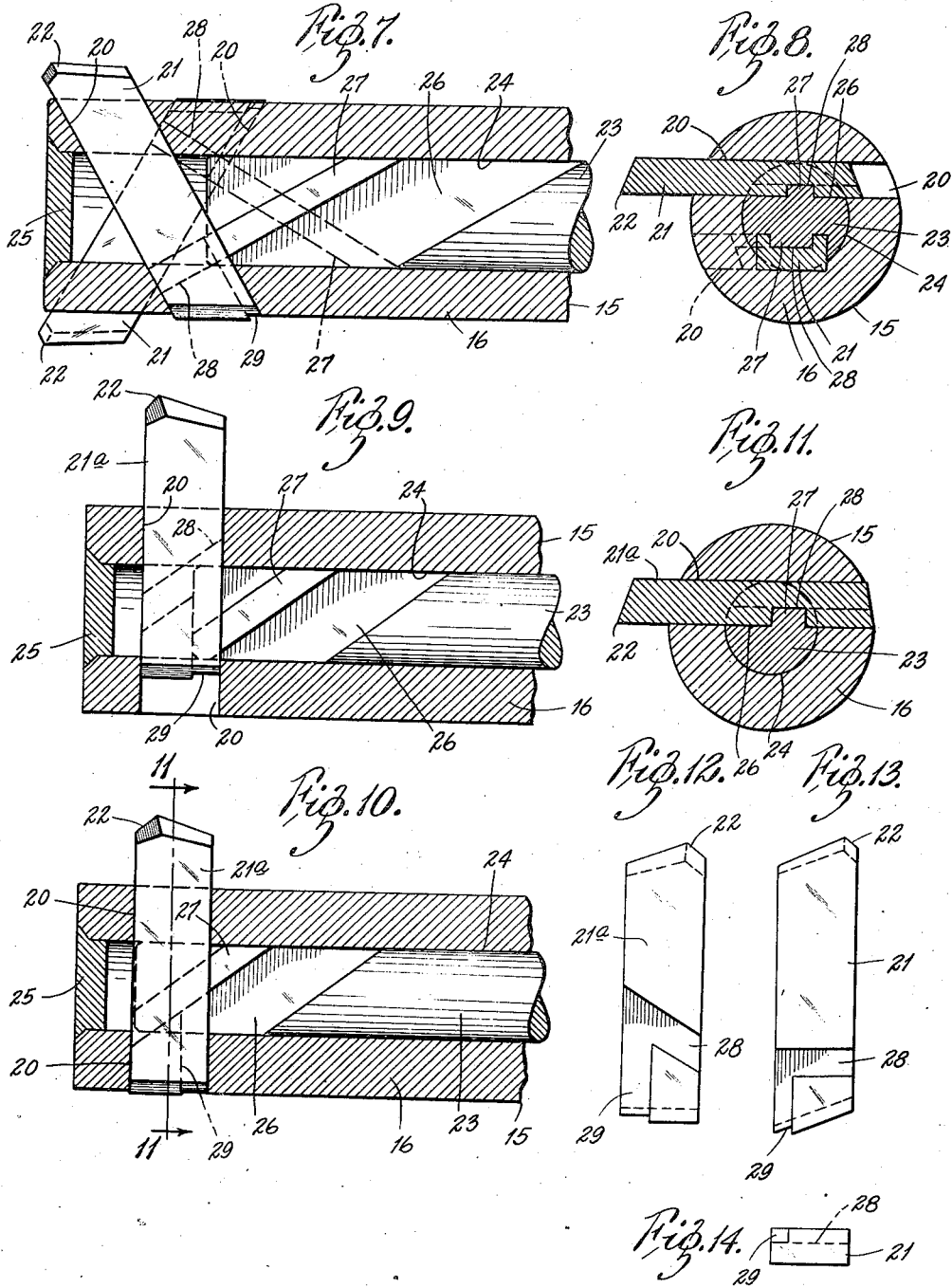

2,278,631

UNITED STATES PATENT OFFICE 2,278,631

BORING TOOL

William Kyle Young, Detroit, Mich., assignor to Eclipse Counterbore Company, Detroit, Mich., a corporation of Michigan Application March 22, 1939, Serial No. 263,471

10 Claims. (Cl. 77—58)

This invention relates to boring tools of the type wherein the cutters are adjusted transversely of the tool by means of a member movable longitudinally thereof and having oblique rib-and-groove connections with said cutters. The objects of the present invention are to provide a strong, simple and compact tool of the above type that will provide for the ready insertion and removal and adjustment of the cutters and the easy engagement of the oblique rib-and-groove connections; that will provide for supporting the cutters in all positions of their adjustment; that will provide for boring a shouldered hole and for boring to the bottom of a blind hole; and that will work in holes of comparatively small diameter. The invention consists in the boring tool and in the combinations and arrangements of parts hereinafter described and claimed.

In the accompanying drawings, which form part of this specification and wherein like symbols refer to like parts wherever they occur, Fig. 1 is a plan view of a boring tool embodying my invention, Fig. 2 is an end view of the cutting end of the tool, Fig. 3 is an enlarged fragmentary central vertical longitudinal section on the line 3—3 in Fig. 1, Fig. 4 is a vertical cross-section on the line 4—4 in Fig. 3, Fig. 5 is an enlarged fragmentary central horizontal longitudinal section on the line 5—5 in Fig. 2, with the oblique ribs of the cutter actuating rod shown in full engagement with the grooves of the cutters, Fig. 6 is a section similar to Fig. 5, showing the lateral support afforded the cutters by the oblique ribs before said ribs enter the oblique grooves in said cutters, Fig. 7 is a view similar to Fig. 6, showing the cutters with their grooves in position to receive the entering ends of the oblique ribs, Fig. 8 is a vertical cross-section on the line 8—8 in Fig. 5, Fig. 9 is a section similar to Fig. 6, showing a boring tool provided with a single cutter disposed at right angles to the tool axis, Fig. 10 is a view similar to Fig. 9, showing the oblique rib of the cutter actuating plunger in substantially full engagement with the groove of the cutter, Fig. 11 is a vertical cross-section on the line 11—11 in Fig. 10, Fig. 12 is a side elevation of the grooved and rabbeted side of the cutter shown in Figs. 9 to 11, Fig. 13 is a similar view of one of the cutters shown in Figs. 1 to 8; and Fig. 14 is an inner end view of the cutter shown in Fig. 13.

The boring tool shown in Figs. 1 to 8, inclusive, of the accompanying drawings comprises a cylindrical body 15 with a hollow cylindrical tool supporting outer end portion 16 of relatively small diameter, adapted to be inserted in the hole to be bored, an inner end or shank portion 17 of slightly larger diameter, having a threaded axial bore 18, adapted for cooperation with a suitable machine tool (not shown), and an intermediate portion 19 of relatively large diameter adjacent to its outer end. The hollow cylindrical tool supporting portion 16 of the tool has pairs of alined rectangular openings 20 that extend therethrough on opposite sides of and at reverse oblique angles to the tool axis and are adapted to support a pair of cutters 21 for relative sliding movement at reversed oblique angles to said axis. These cutters project on opposite sides of the hollow cylindrical hole engaging portion 16 of the tool body and are provided at their outer ends with suitable cutting edges 22 that extend beyond the outer end of said body.

The cutters 21 are projected from and are drawn into their supporting openings 20 by means of an actuating member in the form of a solid cylindrical rod 23 having an axial sliding fit in the axial bore 24 of said body. After the plunger is inserted in the axial bore 24, the outer end of said bore is closed by means of a plug 25 that is welded or otherwise permanently secured therein. The outer end portion of the cylindrical rod 23 is slabbed off on opposite sides to form a flat plate portion 26 that slides between the two cutters 21 and has two reversely inclined oblique ribs 27 arranged one on each side thereof and adapted to slidably engage similarly inclined oblique grooves 28 provided therefor in the rib opposing sides of the respective cutters. By this arrangement, when the rod 23 is slid longitudinally in the axial bore 24 towards the outer end of the tool, the oblique rib-and-groove connections between said rod and the cutters 21 forces said cutters outwardly, and when said rod is slid in the opposite direction, said connections serve to draw said cutters inwardly.

As shown in the drawings, the cutters 21 have their opposing inner longitudinal side edges rabbeted or grooved, as at 29, these grooves or rabbets extending from the rib receiving ends of the grooves 28 to the rear ends of said cutters. During the insertion of the cutters in the tool, the outer ends of the ribs 27 of the retracted cutter actuating rod 23 seat in said rabbets and support the inner ends of the cutters until the grooves 28 of the cutters are in position to receive said ribs when said retracted rod is slid outwardly in the axial bore 24. When the cutters are inserted in the tool, the rabbeted edges 29 of said cutters slide across the ends of the ribs 27 until the trailing side walls of the grooves 28 of said cutters abut against the sides of said ribs. In this position of the cutters, the grooves 28 thereof are in accurate endwise alinement with the ribs 27, thus rendering easy the entry of said ribs into the grooves without forcing the parts or breaking or chipping the ends of the ribs or grooves.

Preferably, mechanism for axially sliding the cutter actuating rod 23 in its supporting bore 24 is adapted to limit the inward sliding movement of said rod so as to prevent the ribs 27 thereof being withdrawn from the rabbets 29 in cutters 21. Said mechanism comprises a knurled hollow cylindrical sleeve 30 that surrounds the large intermediate portion 19 of the tool body between an annular shoulder 31 thereon and a cylindrical retaining collar press-fitted or otherwise rigidly mounted thereon. This sleeve has its ends rotatably supported on cylindrical bearings 32 provided therefor on the tool body and retaining collar, respectively; and the portion of said sleeve between said bearings is spaced from the tool body and is internally threaded. The internal threads of the rotary adjusting sleeve 30 cooperate with the threaded outer ends of a cross bar 33 slidable in an elongated slot 34 that is disposed longitudinally of the tool and extends through the sleeve covered portion of the large intermediate portion 19 of the tool body from side to side thereof, whereby rotation of said sleeve causes said cross bar to move longitudinally of the tool body from end to end of said slot, the length of this opening determining the feed of the cutters. The sleeve actuated cross bar extends through the axial rod supporting bore 24 of the tool body and has a snug fit within a transverse groove 35 provided therefor in said rod, whereby said rod is forced to move with said cross bar when movement is imparted thereto by the rotary adjusting sleeve 30.

The adjusting sleeve 30 is provided at one end with a series of circumferentially spaced graduations 36 adapted to cooperate with an index mark 37 on the adjacent portion of the tool body for indicating the diameter of the hole for which the cutters of the tool are adjusted. The rotary cutter adjusting sleeve 30 is held in any desired position of its rotary adjustment preferably by means of a bowed leaf spring 38 whose ends seat within a recess 39 provided therefor in the tool body and whose middle portion bears against the internal screw threads of said sleeve.

The modified construction shown in Figs. 9 to 12, inclusive, is similar to that shown in Figs. 1 to 8, inclusive, except that the modified construction is provided with a single cutter 21a that is disposed at right angles to the tool axis instead of being disposed at an oblique angle thereto.

By the arrangement described, the cutters may be quickly, easily and accurately adjusted for bores of different diameters by turning the rotary adjusting sleeve, which sleeve is firmly but releasably held in all positions of its rotary adjustment by the pressure of the bowed leaf spring thereagainst. The tool is adapted to bore comparatively small holes due to the small diameter of its tool supporting, hole engaging, outer end portion; and the cutters may be adjusted without withdrawing the tool from the hole in which it works. The cutters may be readily inserted and removed from the tool in the retracted position of the cutter actuating rod; and in this position of said rod the ribs seat in the rabbets of the cutters and thus constitute abutments for supporting the inner ends of the cutters even though said ribs are not engaged with the grooves of the cutters. The oblique ribs serve to guide and support the cutters while they are being inserted in the tool; and, when the trailing walls of the grooves of said cutters abut against the ribs, the grooves are in accurate endwise alinement therewith, thereby permitting the ribs to slide into the grooves without any danger of chipping or breaking the corners thereof. The outer end of the rod supporting bore is closed by the plug which is welded in place and provides a closed rigid end for the tool. The cutters extend beyond the outer end of the tool, thereby adapting the tool for use in boring to a shoulder or to the bottom of a hole without the use of special cutters.

Obviously, the hereinbefore described boring tool admits of considerable modification without departing from the invention. Therefore, I do not wish to be limited to the precise construction shown and described. For instance, the angularity of the cutters may be varied by changing the angle of the oblique ribs; and the tool may be provided with one or more cutters at one position along its length or with a series of cutters spaced apart longitudinally of the tool.

What I claim is:

1. A boring tool comprising a body portion having an axial bore and transverse openings intercepting said bore at one side of the axis thereof near the inner and outer ends thereof, a cutter directly supported in the opening near the outer end of said bore for sliding movement transversely thereof, a rod axially slidable in said bore and having a portion that overlaps the adjacent face of said cutter and has a direct sliding oblique rib-and-groove connection therewith, a cross bar supported in the opening near the inner end of said bore for sliding movement longitudinally thereof, said cross bar having threaded end portions and a connection with said rod preventing relative movement therebetween longitudinally of said rod, and a sleeve mounted on said body for rotary but non-axial sliding movement relative thereto and having internal threads in engagement with the threaded ends of said cross bar.

2. A boring tool comprising a cylindrical body portion having a cylindrical axial bore and transverse openings intercepting said bore at points spaced apart longitudinally thereof, a cutter directly supported in one of said openings for sliding movement therein transversely of said bore, a cross bar supported in the other of said openings for sliding movement longitudinally of said bore and having threaded ends, a solid cylindrical rod axially slidable in said bore and having a flat end portion that overlaps the adjacent face of said cutter and has a direct sliding oblique rib-and-groove connection therewith, said rod having a cross groove therein that snugly receives said cross bar, a cylindrical sleeve mounted on said cylindrical body portion for rotary but non-axial sliding movement relative thereto and having internal threads intermeshing with the threaded ends of said cross bar, and a bowed spring interposed between said body portion and said sleeve and bearing thereagainst.

3. A boring tool comprising a cylindrical body having a cylindrical axial bore and an opening extending through said body transversely thereof and intercepting said bore on one side only of its axis, a cutter directly slidable in said opening transversely of said bore, a cylindrical rod mounted for axial sliding movement in said bore, said rod having a flatsided outer end portion having a direct sliding oblique rib-and-groove connection with said cutter, said body having an opening extending therethrough transversely thereof and intercepting said bore, a cross bar having threaded ends and supported in said last mentioned opening for sliding movement therein longitudinally of said body, said cross bar having a connection with said rod preventing relative movement therebetween longitudinally of said rod, and an internally threaded sleeve mounted on said body for rotary but non-axial sliding movement and operatively engaging the threaded ends of said cross bar.

4. A boring tool comprising a cylindrical body having a cylindrical axial bore and an opening extending therethrough at an oblique angle to said bore and intercepting said bore at one side of the axis thereof, a cutter directly slidable in said oblique opening at an oblique angle to said axis and adapted to extend beyond the outer end of said body, a solid cylindrical rod of uniform diameter mounted for axial sliding movement in said bore and having a flatsided portion extending clear to the outer end of said rod and adapted to overlap said cutter when said rod is slid in one direction and to move entirely clear of said cutter when said rod is slid in the opposite direction, and a direct sliding oblique rib-and-groove connection between said portion of said rod and said cutter for actuating said cutter when said rod is slid axially in said bore.

5. A boring tool comprising a cylindrical body having a cylindrical axial bore and an oblique opening intercepting said bore at one side of the axis thereof, a cutter directly slidable in said oblique opening and adapted to extend beyond the outer end of said body, a cylindrical rod mounted for axial sliding movement in said bore and having a flatsided outer end portion adapted to overlap said cutter, and a direct sliding oblique rib-and-groove connection between said portion of said rod and said cutter for actuating said cutter when said rod is slid axially in said bore, and means for actuating said rod, said means comprising an internally threaded sleeve mounted on said body for rotary but non-axial sliding movement, and a cross bar mounted for longitudinal sliding movement in said body, said rod being secured to said cross bar against movement longitudinally thereof and having threaded end portions adapted to engage the internal threads of said sleeve.

6. A boring tool comprising a body portion, a removable cutter mounted in said body portion for sliding movement transversely thereof, a member mounted in said body portion for sliding movement longitudinally thereof and an oblique rib-and-groove connection between said member and said cutter adapted to actuate said cutter when said member is actuated, said connection comprising a groove in said cutter and a rib on said member, said cutter having a recess extending along one longitudinal corner thereof from the tool entering end thereof to the rib receiving end of the groove thereof and adapted when said cutter is inserted in said body to be engaged by said rib until said groove is in endwise alinement with said rib.

7. A boring tool comprising a body portion, a removable cutter directly mounted in said body portion for sliding movement transversely thereof, a member mounted in said body portion for sliding movement longitudinally thereof, and a direct oblique rib-and-groove connection between said member and said cutter adapted to actuate said cutter when said member is actuated, said cutter having its rib opposing edge rabbetted from the tool entering end thereof to the rib receiving end thereof, whereby when said cutter is inserted in said body said rib seats in said rabbet and supports and guides said cutter until the rib opposing side wall of said groove abuts against said rib to thereby locate said groove in accurate endwise alinement with said rib.

8. A cutter for a boring tool of the kind described comprising a body portion having a rib receiving groove extending across one face thereof and a rabbet extending along a side edge of said face from the tool entering end of said cutter to the rib receiving end of said groove.

9. In a boring tool, in combination, a main body having a bore therein and an opening therethrough extending transversely to the axis of said main body and intersecting said bore, a plunger axially slidably received in said bore, a cutter blade longitudinally slidably received in said opening, a key on said plunger disposed at an oblique angle with respect to the axis thereof, said cutter blade having a keyway therein for slidable reception of said key whereby to connect said plunger and cutter blade together for simultaneous movement in the direction of their respective lengths, one face of said cutter blade disposed axially with respect to said plunger being cut away from one end thereof to said keyway for reception of an end portion of said key and to form a shoulder at said keyway for engagement with said key for facilitating operative interengagement of said plunger and cutter blade during assembly thereof.

10. In a boring tool or the like, in combination, a main body having a bore therein and an opening therethrough disposed transversely with respect to the axis of said main body, a plunger axially slidably received in said bore, a cutter blade longitudinally slidably received in said opening, a key formed on said plunger and extending at an angle to the axis thereof, said cutter blade being formed with a keyway therein for slidable reception of said key whereby to form an operative connection between said plunger and cutter blade for causing movement of said cutter blade longitudinally thereof simultaneously with axial movement of said plunger, a shoulder formed on at least one face of said cutter blade disposed axially with respect to said plunger and engageable with said key to limit movement of said cutter blade longitudinally thereof in one direction when said key is projected a limited distance into intersecting relation with respect to said opening during assembly of said blade to said main body.

WILLIAM KYLE YOUNG.